(12) United States Patent
Baker

(10) Patent No.: US 10,697,169 B2
(45) Date of Patent: Jun. 30, 2020

(54) TOTAL SUSPENDED SOLIDS REDUCTION SYSTEM

(71) Applicant: Robert L. Baker, Marshall, NC (US)

(72) Inventor: Robert L. Baker, Marshall, NC (US)

( * ) Notice: Subject to any disclaimer, the term of this patent is extended or adjusted under 35 U.S.C. 154(b) by 0 days.

(21) Appl. No.: 16/014,476

(22) Filed: Jun. 21, 2018

(65) Prior Publication Data

US 2018/0371739 A1 Dec. 27, 2018

Related U.S. Application Data

(60) Provisional application No. 62/523,014, filed on Jun. 21, 2017.

(51) Int. Cl.

| | |
|---|---|
| *E03F 5/14* | (2006.01) |
| *E03F 11/00* | (2006.01) |
| *B01D 21/00* | (2006.01) |
| *B01D 21/24* | (2006.01) |
| *E03F 1/00* | (2006.01) |
| *C02F 1/00* | (2006.01) |
| *E03F 5/10* | (2006.01) |
| *C02F 3/30* | (2006.01) |

(52) U.S. Cl.
CPC ............. *E03F 5/14* (2013.01); *B01D 21/003* (2013.01); *B01D 21/0084* (2013.01); *B01D 21/0087* (2013.01); *B01D 21/2427* (2013.01); *B01D 21/2444* (2013.01); *C02F 1/006* (2013.01); *C02F 3/308* (2013.01); *E03F 1/003* (2013.01); *E03F 5/105* (2013.01); *E03F 11/00* (2013.01); *C02F 2001/007* (2013.01); *C02F 2203/002* (2013.01); *C02F 2301/026* (2013.01); *C02F 2301/08* (2013.01)

(58) Field of Classification Search
CPC .............. B01D 21/0087; B01D 21/003; B01D 21/0084; B01D 21/2444; B01D 21/2427; B01D 21/0033; C02F 2301/026; C02F 2203/002; C02F 2001/007; C02F 2301/08; C02F 3/308; C02F 1/006; C02F 3/20; E03F 5/14; E03F 11/00; E03F 1/003; E03F 5/105; F16L 11/11
USPC ............... 210/264, 521, 532.2, 540; 138/121
See application file for complete search history.

(56) References Cited

U.S. PATENT DOCUMENTS

| | | | | |
|---|---|---|---|---|
| 3,907,679 | A | * | 9/1975 | Yost .......................... B01D 1/02 159/16.1 |
| 4,523,613 | A | * | 6/1985 | Fouss .................... E02B 11/005 138/121 |

(Continued)

*Primary Examiner* — Claire A Norris
*Assistant Examiner* — Ekandra S. Miller-Cruz

(57) ABSTRACT

A modular system for reducing the total suspended solids of waste, including scum, sludge and water layers, includes a plurality of chambers each being connected in succession by a corresponding one of a plurality of flow pipe segments including an inlet segment, an outlet segment and at least one middle segment, wherein the waste enters the septic tank via the inlet segment and is transferred between each of the plurality of chambers via the at least one middle segment; a corrugated flow pipe in fluid flow communication with the outlet segment; and the corrugated flow pipe being sized and configured for use as a settling zone for removal of a portion of the total suspended solids and wherein an amount of water from the water layer within the chamber adjacent the outlet segment enters the corrugated flow pipe and passes through the outlet segment.

6 Claims, 2 Drawing Sheets

(56) References Cited

U.S. PATENT DOCUMENTS

| | | | | |
|---|---|---|---|---|
| 5,690,824 A | * | 11/1997 | Stuth | B01D 29/05 |
| | | | | 210/333.01 |
| 2009/0032450 A1 | * | 2/2009 | Connelly | B01D 21/0003 |
| | | | | 210/109 |
| 2010/0006489 A1 | * | 1/2010 | Davis, Jr. | E02B 13/02 |
| | | | | 210/170.08 |

* cited by examiner

TOTAL SUSPENDED SOLIDS REDUCTION SYSTEM

RELATED APPLICATION

This application claims priority to and incorporates entirely by reference U.S. Provisional Patent Application Ser. No. 62/523,014 filed on Jun. 21, 2017.

FIELD OF THE INVENTION

This invention relates to management of the number of particles that are present in wastewater and, more particularly, a system for improving the quality of waste water dispersed by a residential septic system.

BACKGROUND OF THE INVENTION

The composition of the waste material in a septic system primarily comprises water and a reduction in the total suspended solids therein would realize a direct correlation in the negative environmental effects of nitrogen and phosphorous released into the drain field. Excessive amounts of nitrogen and phosphorus that enter the ground from numerous sources (not just from the TSS exiting septic tanks) have been documented to enter the ground water. The solids in wastewater can consist of organic and/or inorganic materials and organisms. Generally, the solids must be significantly reduced by separation methods or they run the risk of causing disease or detrimental environmental effects. These solids include the suspended solids and the settleable solids. If untreated, the suspended solids in wastewater will clog or penetrate the filter media and reduce the effectiveness of the system. The settleable solids include materials such as organic and inorganic materials that settle out from the rest of the wastewater during the preliminary stages of treatment.

There exists a need for a total suspended solids reduction system for reducing the toxic output of a septic system that is adapted for use in combination with existing septic systems.

SUMMARY OF THE INVENTION

In accordance with one form of this invention, there is provided a modular system for reducing the total suspended solids of waste, including a scum layer, a sludge layer and a water layer, in a septic tank, the modular system including a plurality of chambers each being defined by a perimeter wall, each of the plurality of chambers being connected in succession by a corresponding one of a plurality of flow pipe segments; the plurality of chambers being sized and configured to hold the waste, including the scum layer, the sludge layer and the water layer; the plurality of flow pipe segments including an inlet segment, an outlet segment and at least one middle segment, wherein the waste enters the septic tank via the inlet segment and is transferred between each of the plurality of chambers via the at least one middle segment; a corrugated flow pipe in fluid flow communication with the outlet segment, the corrugated flow pipe being located in the chamber adjacent the outlet segment; and the corrugated flow pipe being sized and configured for use as a settling zone for removal of a portion of the total suspended solids and wherein an amount of water from the water layer within the chamber adjacent the outlet segment enters the corrugated flow pipe and passes through the outlet segment.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 1:
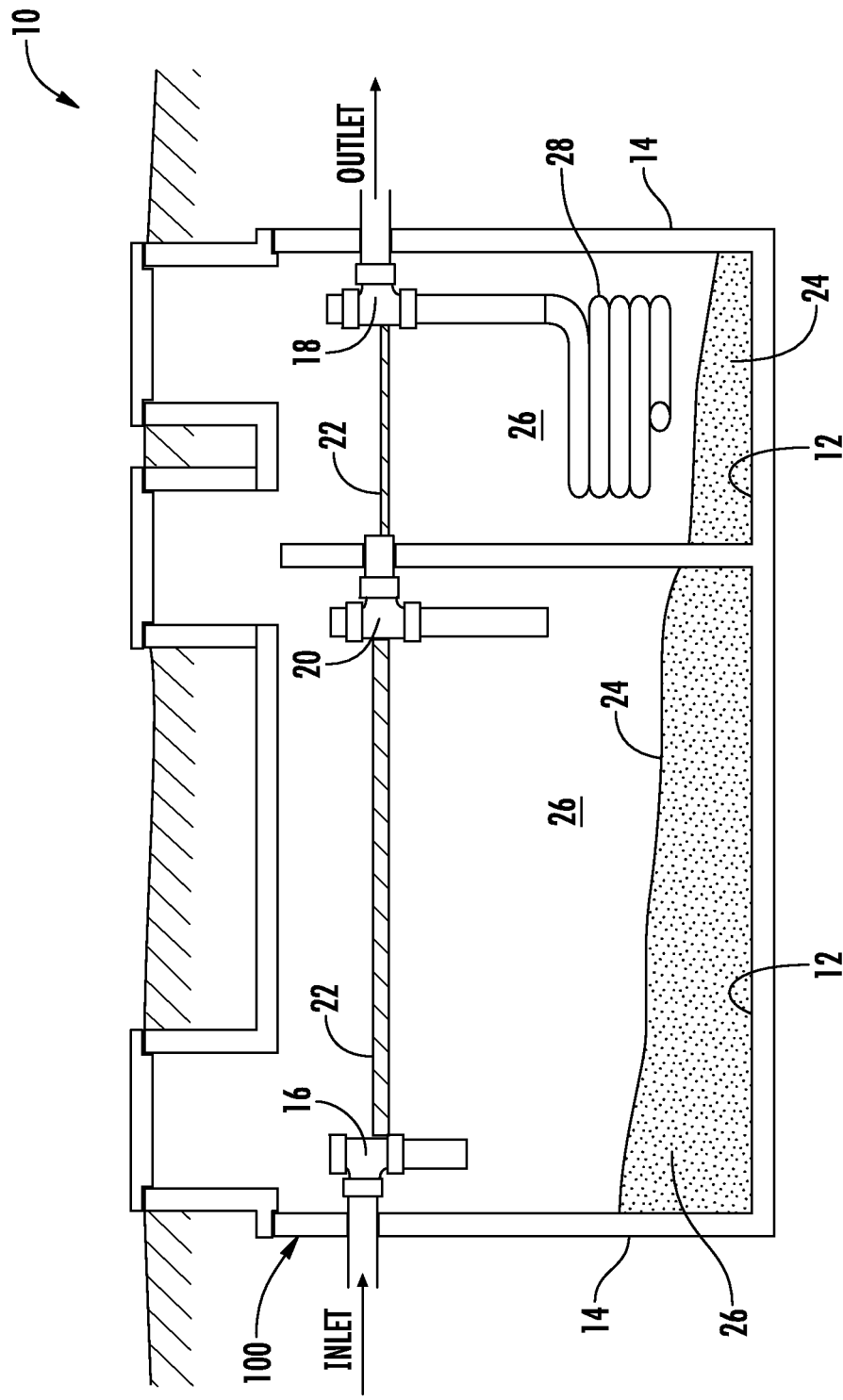
FIG. 1 illustrates a side elevational view illustrating a schematic diagram of the system for reducing the total suspended solids according to one embodiment.

Referring to the drawings, the system 10 for reducing the total suspended solids includes the following distinct elements:
  a plurality of chambers 12
  an inlet segment 16
  an outlet segment 18
  at least one middle segment 20
  corrugated flow pipe 28
Importantly, various embodiments of the modular system for reducing the total suspended solids of waste in a septic tank 100 may include variations of the above elements.

Figure 2:
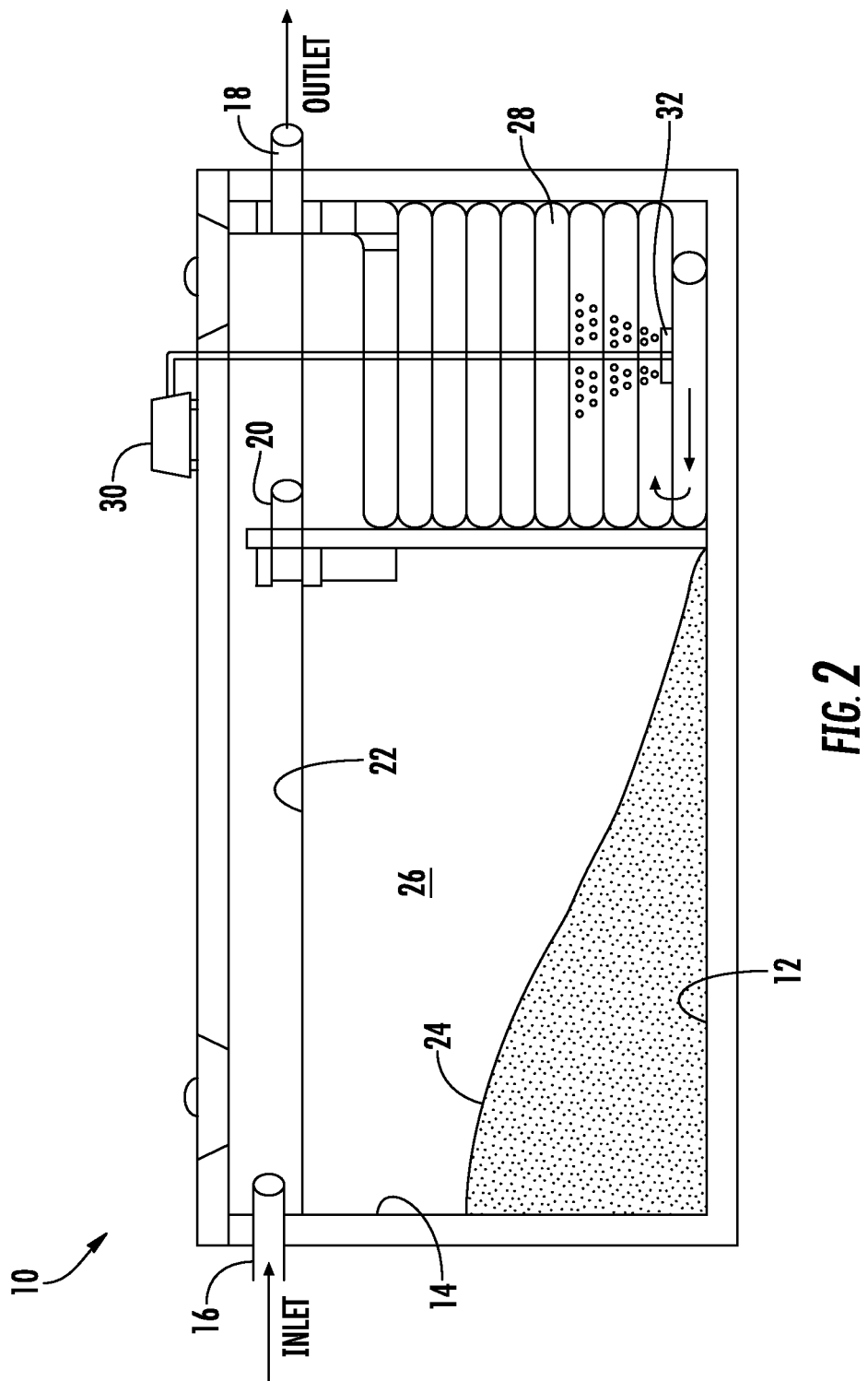
FIG. 2 illustrates a side elevational view illustrating a schematic diagram of the system for reducing the total suspended solids according to one embodiment.

Referring to FIGS. 1 and 2, the modular system 10 for reducing the total suspended solids of waste in a septic tank 100 includes a plurality of chambers 12 each being defined by a perimeter wall 14. Each chamber 12 is connected in succession by a respective flow pipe segment, including an inlet segment 16, an outlet segment 18, and at least one middle segment 20. The waste includes a scum layer 22, a sludge layer 24, and a water layer 26. The water layer 26 within the chamber 12 closest to the outlet segment 18 passes through a corrugated flow pipe 28 attached to the outlet segment 18 of the septic tank 100. In one embodiment, the total length of the corrugated flow pipe is at least thirty (30) feet in length. The corrugated flow pipe 28 is configured for use as a settling zone for removal of a portion of the remaining suspended solids before going into the drain field via the outlet of the septic tank 100.

A preferred embodiment of the corrugated flow pipe 28, as shown in FIG. 1, is a spiralized corrugated flow pipe 28. The longer the distance that the TSS travels before exiting the tank results in reduced amounts of total suspended solids in the drain field water.

Referring now to FIG. 2, for improved removal of the suspended solids, an aerator 30 and diffusor 32 may be included for operation near the bottom of the chamber 12 adjacent the outlet segment 18.

As discussed above, the system 10 serves to reduce the amount of nitrogen and phosphorus in the waste (water) that exits the septic tank and enters the drain field. Any reduction of these two elements reduces the amount of these pollutants in the surface and ground water.

While the present invention has been shown and described in accordance with several preferred and practical embodiments, it is recognized that departures from the instant disclosure are contemplated within the spirit and scope of the present invention.

What is claimed is:

1. A modular system for reducing the total suspended solids of waste, including a scum layer, a sludge layer and a water layer, in a septic tank, the modular system comprising:
   a plurality of chambers each being defined by a perimeter wall, each of the plurality of chambers being connected in succession by a corresponding one of a plurality of flow pipe segments;
   the plurality of chambers being sized and configured to hold the waste, including the scum layer, the sludge layer and the water layer;
   the plurality of flow pipe segments including an inlet segment, an outlet segment and at least one middle segment, wherein the waste enters the septic tank via the inlet segment and is transferred between each of the plurality of chambers via the at least one middle segment;
   a corrugated flow pipe in fluid flow communication with the outlet segment, the corrugated flow pipe being located in the chamber adjacent the outlet segment; wherein the corrugated flow pipe is a spiralized corrugated flow pipe; the outlet segment being located above the corrugated flow pipe; and the corrugated flow pipe being sized and configured for use as a settling zone for removal of a portion of the total suspended solids and wherein an amount of water from the water layer within the chamber adjacent the outlet segment enters the corrugated flow pipe and passes through the outlet segment.

2. The modular system for reducing the total suspended solids of waste as recited in claim 1 wherein the corrugated flow pipe is at least thirty feet in length.

3. The modular system for reducing the total suspended solids of waste as recited in claim 1 further comprising and aerator and diffusor in the chamber adjacent the outlet segment.

4. A modular system for reducing the total suspended solids of waste, including a scum layer, a sludge layer and a water layer, in a septic tank, the modular system comprising:
   a plurality of chambers each being connected in succession by a corresponding one of a plurality of flow pipe segments including an inlet segment, an outlet segment and at least one middle segment, and wherein the waste enters the septic tank via the inlet segment and is transferred between each of the plurality of chambers via the at least one middle segment;
   a corrugated flow pipe in fluid flow communication with the outlet segment; wherein the corrugated flow pipe is a spiralized corrugated flow pipe; the outlet segment being located above the corrugated flow pipe; and the corrugated flow pipe being sized and configured for use as a settling zone for removal of a portion of the total suspended solids and wherein an amount of water from the water layer within the chamber adjacent the outlet segment enters the corrugated flow pipe and passes through the outlet segment.

5. The modular system for reducing the total suspended solids of waste as recited in claim 4 wherein the corrugated flow pipe is a spiralized corrugated flow pipe.

6. The modular system for reducing the total suspended solids of waste as recited in claim 4 further comprising and aerator and diffusor in the chamber adjacent the outlet segment.

* * * * *